US010187582B2

(12) United States Patent
Wang (10) Patent No.: US 10,187,582 B2
(45) Date of Patent: Jan. 22, 2019

(54) INFRARED CAMERA AND INFRARED LAMP BRIGHTNESS ADJUSTMENT METHOD THEREFOR

(71) Applicant: HANGZHOU HIKVISION DIGITAL TECHNOLOGY CO., LTD., Zhejiang (CN)

(72) Inventor: Yuming Wang, Zhejiang (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 89 days.

(21) Appl. No.: 15/110,601

(22) PCT Filed: Jan. 6, 2015

(86) PCT No.: PCT/CN2015/070147
§ 371 (c)(1),
(2) Date: Jul. 8, 2016

(87) PCT Pub. No.: WO2015/103961
PCT Pub. Date: Jul. 16, 2015

(65) Prior Publication Data
US 2016/0381272 A1 Dec. 29, 2016

(30) Foreign Application Priority Data
Jan. 10, 2014 (CN) .......................... 2014 1 0012898

(51) Int. Cl.
*H04N 5/235* (2006.01)
*H04N 5/243* (2006.01)
(Continued)

(52) U.S. Cl.
CPC ............. *H04N 5/2351* (2013.01); *G06T 7/11* (2017.01); *H04N 5/2256* (2013.01);
(Continued)

(58) Field of Classification Search
CPC .. H04N 5/2351; H04N 5/2256; H04N 5/2354; H04N 5/33; H04N 7/183; G06T 7/0081
(Continued)

(56) References Cited

U.S. PATENT DOCUMENTS

| 2004/0047518 | A1* | 3/2004 | Tiana ....................... G06T 5/50 382/284 |
| 2004/0105027 | A1* | 6/2004 | Kawamura ........ H04N 5/23245 348/362 |

(Continued)

FOREIGN PATENT DOCUMENTS

| CN | 201733490 U | 2/2011 |
| CN | 102368809 A * | 9/2011 |

(Continued)

OTHER PUBLICATIONS

International Search Report (in English and Chinese) and Written Opinion of the International Searching Authority (in Chinese) for PCT/CN2015/070147, dated Apr. 9, 2015; ISA/CN.

(Continued)

*Primary Examiner* — Zaihan Jiang
(74) *Attorney, Agent, or Firm* — Harness, Dickey & Pierce, P.L.C.

(57) ABSTRACT

Disclosed are an infrared camera and an infrared lamp brightness adjustment method therefore. The method comprises: when an infrared lamp of an infrared camera is turned on, conducting following processing at a pre-set time period: determining whether there is at least one sub-region with abnormal brightness in N sub-regions of the same size, which constitute a monitoring picture, where N is a positive integer which is greater than 1; and if so, according to a pre-determined parameter of the acquired at least one sub-region with abnormal brightness and a pre-determined parameter of the monitoring picture, determining an infrared lamp adjustment manner, and according to the determined
(Continued)

infrared lamp adjustment manner, conducting infrared lamp brightness adjustment so that the at least one sub-region with the abnormal brightness is recovered to be normal. By means of the solution of the present invention, the picture of the monitoring picture can be improved.

19 Claims, 2 Drawing Sheets

(51) Int. Cl.
    *H04N 7/18*     (2006.01)
    *H04N 5/225*     (2006.01)
    *H04N 5/33*     (2006.01)
    *G06T 7/00*     (2017.01)
    *G06T 7/11*     (2017.01)

(52) U.S. Cl.
    CPC .......... *H04N 5/2354* (2013.01); *H04N 5/243* (2013.01); *H04N 5/33* (2013.01); *H04N 7/183* (2013.01)

(58) Field of Classification Search
    USPC ........................................................ 348/143
    See application file for complete search history.

(56) References Cited

U.S. PATENT DOCUMENTS

| | | | |
|---|---|---|---|
| 2005/0199815 A1* | 9/2005 | Murakumo | H04N 5/2354 250/354.1 |
| 2005/0213838 A1* | 9/2005 | Kuramoto | H04N 1/4097 382/254 |
| 2007/0014439 A1* | 1/2007 | Ando | G06K 9/00771 382/118 |
| 2008/0012942 A1 | 1/2008 | Kawamura et al. | |
| 2008/0027317 A1* | 1/2008 | Wood | A61B 5/0059 600/427 |
| 2008/0122927 A1 | 5/2008 | Konno et al. | |
| 2008/0151052 A1 | 6/2008 | Erel et al. | |
| 2008/0246781 A1* | 10/2008 | Surati | H04N 5/74 345/690 |
| 2009/0131104 A1 | 5/2009 | Yoon | |
| 2010/0321497 A1 | 12/2010 | Onishi et al. | |
| 2011/0274319 A1* | 11/2011 | Su | A61B 5/117 382/117 |
| 2011/0298909 A1* | 12/2011 | Ando | H04N 5/2256 348/77 |
| 2012/0206050 A1* | 8/2012 | Spero | B60Q 1/04 315/152 |
| 2012/0294600 A1* | 11/2012 | Osawa | G03B 7/08 396/164 |
| 2013/0044225 A1 | 2/2013 | Jeon | |
| 2014/0198218 A1* | 7/2014 | Afrooze | H04N 5/235 348/229.1 |
| 2014/0253735 A1* | 9/2014 | Fox | H04N 5/2252 348/164 |
| 2015/0070566 A1* | 3/2015 | Yoshida | G01C 11/02 348/349 |
| 2016/0164261 A1* | 6/2016 | Warren | H01S 5/18388 348/164 |
| 2016/0165154 A1* | 6/2016 | Shinomiya | G06F 3/017 348/164 |

FOREIGN PATENT DOCUMENTS

| | | |
|---|---|---|
| CN | 102256066 A | 11/2011 |
| CN | 102368809 A | 3/2012 |
| CN | 102821250 A | 12/2012 |
| CN | 103118232 A | 5/2013 |

OTHER PUBLICATIONS

Chinese Office Action for Application No. 201410012898.4 dated May 24, 2017.
European Search Report for Application No. 15734896.2 dated May 8, 2017.
European Office Action for Application No. 15734896.2 dated Jul. 17, 2018.
European Office Action for Application No. 15734896.2 dated Mar. 6, 2018.

\* cited by examiner

INFRARED CAMERA AND INFRARED LAMP BRIGHTNESS ADJUSTMENT METHOD THEREFOR

CROSS-REFERENCE TO RELATED APPLICATIONS

This application is a U.S. National Phase application under 35 U.S.C. § 371 of International Application No. PCT/CN2015/070147, filed Jan. 6, 2015, entitled "INFRARED CAMERA AND INFRARED LAMP BRIGHTNESS ADJUSTMENT METHOD THEREFOR", the entire contents of which are incorporated herein by reference.

FIELD OF THE DISCLOSURE

The present disclosure relates to a security control field, and more particularly, to an infrared camera and an infrared lamp brightness adjusting method for an infrared camera.

BACKGROUND OF THE DISCLOSURE

At present, a camera with an infrared function (e.g., a speed dome camera) uses an infrared light fill strategy, i.e., multiple groups of infrared lamps with different illumination angles are time-sharingly opened in different magnifications, so as to achieve an intention that video surveillance can be implemented in a low light environment, and a surveillance image is clear.

In addition, an average brightness value of the surveillance image can be obtained, the obtained average brightness value can be compared with a preset brightness reference value, and the brightness of the infrared lamp can be adjusted according to a comparison result, so as to achieve an intention of adjusting the brightness of the surveillance image.

However, according to the method above, the average brightness value of the whole surveillance image is used as an adjustment parameter. Thus, only rough adjustment for the whole surveillance image can be implemented, and it is not ensured that there is no brightness sudden change in each region in the surveillance image. That is, a certain sub-region may be overexposed or a too dark, so as to reduce image quality of the surveillance image.

SUMMARY OF THE INVENTION

The present invention provides an infrared camera and an infrared lamp brightness adjusting method for an infrared camera, so as to improve image quality of a surveillance image.

In order to improve the intention above, technical solutions according to the present disclosure are improved as follows.

An infrared lamp brightness adjusting method for an infrared camera includes:

after an infrared lamp of the infrared camera is opened, performing processing as follows in each preset time period:

determining whether there is at least one sub-region with abnormal brightness in N sub-regions in a surveillance image, the N sub-regions having a same size with each other, N being a positive integer more than 1;

if yes, determining an infrared lamp adjustment mode according to a preset parameter of a respective one of the at least one sub-region with the abnormal brightness and a preset parameter of the surveillance image, and adjusting a brightness of the infrared lamp according to the determined infrared lamp adjustment mode until the at least one sub-region with the abnormal brightness returns to normal.

An infrared camera includes:

a timing module, to after an infrared lamp of the infrared camera is opened, notify a fine adjustment module to perform processing of the fine adjustment module in each preset time period;

the fine adjustment module, to determine whether there is at least one sub-region with abnormal brightness in N sub-regions in a surveillance image, the N sub-regions having a same size with each other, N being a positive integer more than 1; if yes, determine an infrared lamp adjustment mode according to a preset parameter of a respective one of the at least one sub-region with the abnormal brightness and a preset parameter of the surveillance image, and adjust a brightness of the infrared lamp according to the determined infrared lamp adjustment mode until the at least one sub-region with the abnormal brightness returns to normal.

It can be seen from above that, according to the present disclosure, the surveillance image is divided into multiple sub-regions, and for each sub-region, whether the sub-region is in abnormal brightness is determined, if yes, an infrared lamp adjustment mode is determined according to a obtained preset parameter, and a brightness of the infrared lamp is adjusted until the at least one sub-region with the abnormal brightness returns to normal. Thus, it can be avoided that certain sub-regions are too dark or overexposed, and image quality of the surveillance image can be improved.

DETAILED DESCRIPTION OF THE DISCLOSURE

In order to solve problems in the existing technology, an infrared lamp brightness adjusting method for an infrared camera is provided in the present disclosure, so as to improve image quality of a surveillance image.

In particular, after an infrared lamp of an infrared camera is opened (the infrared lamp of the infrared camera is usually opened in a low luminance environment), a process as follows is performed in a preset time period: determining whether there is a sub-region with abnormal brightness in N sub-regions having a same size and constituting a surveillance image, wherein N is a positive integer more than 1; if yes, determining an infrared lamp adjustment mode according to a preset parameter of the obtained sub-region with the abnormal brightness and a preset parameter of the surveillance image, and adjusting the brightness of the infrared lamp according to the determined infrared lamp adjustment mode until the sub-region with the abnormal brightness returns to normal.

The process above is referred to as a fine adjustment. In a practical application, in order to further improve the image quality of the surveillance image, rough adjustment is performed before the fine adjustment is performed. That is, before determining whether there is the sub-region with the abnormal brightness, a process as follows is performed: determining whether a current gain value of the surveillance image is in a reasonable gain interval, if yes, directly determining whether there is the sub-region with the abnormal brightness; if no, determining an infrared lamp adjustment mode according to a preset parameter of the obtained surveillance image, adjusting the brightness of the infrared lamp according to the determined infrared lamp adjustment mode, so as to adjust the gain value of the surveillance image into the reasonable gain interval, and then determining whether there is the sub-region with the abnormal brightness.

The rough adjustment is performed for the whole surveillance image, and cannot ensure that there is no brightness sudden change in each sub-region in the surveillance image. Thus, the fine adjustment may be performed. After the fine adjustment is performed, detail clarity of the surveillance image can be sufficiently preserved. In a practical application, only the fine adjustment may be performed for the surveillance image. In another example, both the rough adjustment and the fine adjustment may be simultaneously performed.

In order to make the object, technical solution and merits of the present disclosure clearer, the present disclosure will be illustrated in detail hereinafter with reference to the accompanying drawings and specific examples.

Figure 1:
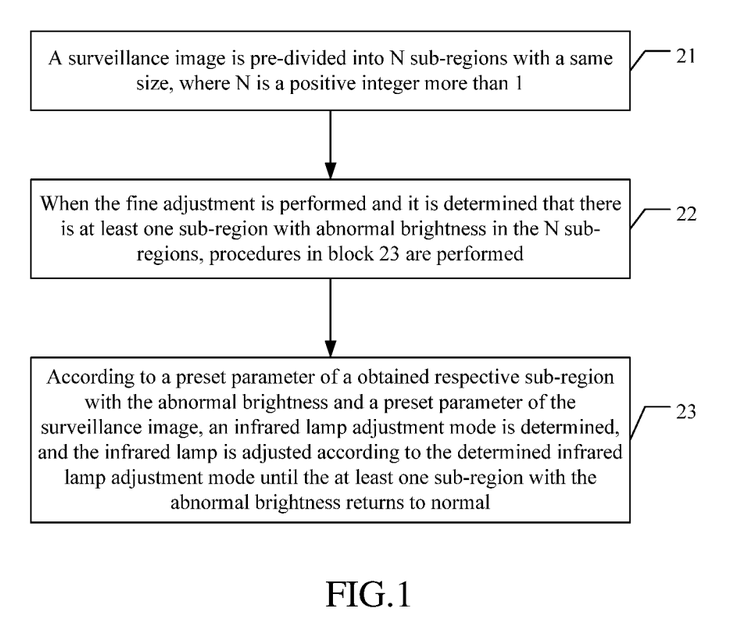
FIG. 1 is a flowchart illustrating a rough adjustment method according to some examples of the present disclosure.

FIG. 1 is a flowchart illustrating a rough adjustment method according to some examples of the present disclosure. As shown in FIG. 1, the method includes procedures in blocks 11-13.

At block 11, a current gain value of a surveillance image is obtained.

At block 12, when the obtained gain value is outside a reasonable gain interval, a preset parameter of the surveillance image is further obtained.

The reasonable gain interval may be a gain interval corresponding to the image from too dark to overexposed.

If the obtained gain value deviates from the reasonable gain interval, i.e., the obtained gain value is outside the reasonable gain interval, the preset parameter of the surveillance image, i.e., a current magnification Z of the surveillance image, is further obtained, and a viewing angle α (in radians) is calculated according to Z:

$$\alpha = \frac{\pi}{180} \times \frac{\theta}{Z},$$

wherein θ represents a maximum horizontal viewing angle.

At block 13, according to the obtained preset parameter, the infrared lamp adjustment mode is determined, and the brightness of the infrared lamp is adjusted according to the determined infrared lamp adjustment mode until the gain value of the surveillance image is adjusted into the reasonable gain interval.

In this block, α is respectively compared with β3, β2 and β1, and an infrared lamp adjustment mode is determined according to a comparison result. And the brightness of the infrared lamp is adjusted according to the determined infrared lamp adjustment mode, so that the gain value of the surveillance image is adjusted into the reasonable gain interval.

The infrared lamp of the infrared camera usually includes a near lamp, a middle lamp, and a far lamp, wherein illumination angles of the three lamps are different from each other. Usually, an illumination angle of the near lamp>an illumination angle of the middle lamp>an illumination angle of the far lamp, the β3 represents the illumination angle of the far lamp, the β2 represents the illumination angle of the middle lamp, and the β1 represents the illumination angle of the near lamp, thus, β1>β2>β3.

In particular, if α≤β3, the brightness of the far lamp is adjusted until the gain value of the surveillance image is adjusted into the reasonable gain interval;

if α≤β2, the brightness of the far lamp is firstly adjusted, and then the brightness of the middle lamp is adjusted until the gain value of the surveillance image is adjusted into the reasonable gain interval;

if α≤β1, the brightness of the far lamp is firstly adjusted, the brightness of the middle lamp is secondly adjusted, and the brightness of the near lamp is lastly adjusted, so that the gain value of the surveillance image is adjusted into the reasonable gain interval.

For each adjustment, an adjustment magnitude may be determined according to the current magnification of the surveillance image and a distance that the obtained gain value deviates from the reasonable gain interval. In addition, whether the adjustment for increasing the brightness or the adjustment for decreasing the brightness is performed is determined according to a direction that the obtained gain value deviates from the reasonable gain interval.

Take α≤β3 as an example. If the gain value of the surveillance image is still outside the reasonable gain interval after the brightness of the far lamp is adjusted one ted one time, the brightness of the far lamp is further adjusted again, and so forth, until the gain value of the surveillance image is adjusted into the reasonable gain interval.

In addition, take α≤β2 as an example. The process of firstly adjusting the brightness of the far lamp and then adjusting the brightness of the middle lamp includes procedures as follows. If the gain value of the surveillance image is adjusted into the reasonable gain interval after the brightness of the far lamp is adjusted one or more times, the brightness of the middle lamp is not adjusted. And if the gain value of the surveillance image is still not adjusted into the reasonable gain interval after the brightness of the far lamp is adjusted to an extreme value allowed to be adjusted, the brightness of the middle lamp is further adjusted.

In addition, take α≤β1 as an example. If α≤β1, the brightness of the far lamp is adjusted; if the gain value of the surveillance image is still not adjusted into the reasonable gain interval after the brightness of the far lamp is adjusted to an extreme value allowed to be adjusted, the brightness of the middle lamp is adjusted; if the gain value of the surveillance image is still not adjusted into the reasonable gain interval after the brightness of the middle lamp is adjusted to an extreme value allowed to be adjusted, the brightness of the near lamp is adjusted, so that the gain value of the surveillance image is adjusted into the reasonable gain interval.

In some examples, a Pulse Width Modulation (PWM) may be used to adjust the far lamp, the middle lamp and the near lamp. In particular, the brightness of the far lamp, the middle lamp and the near lamp may be adjusted by changing a duty cycle of the PWM, and the precision may reach 0.1%.

Figure 2:
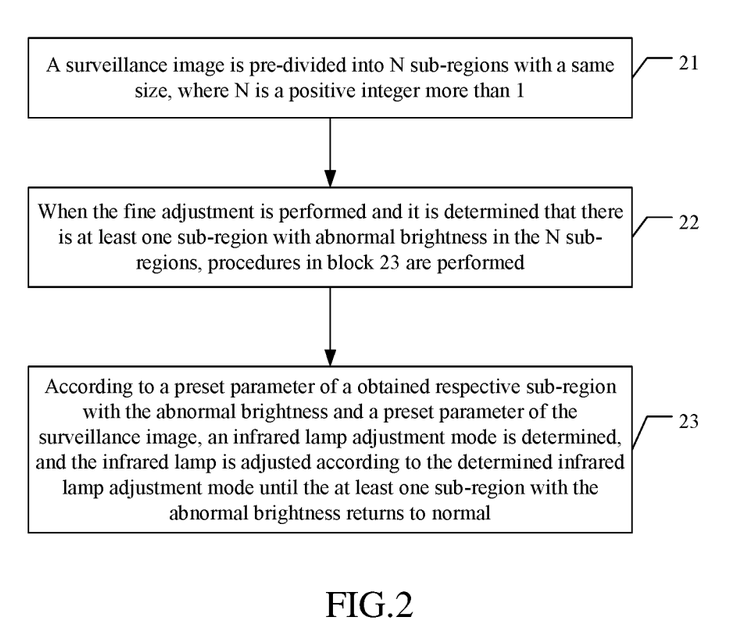
FIG. 2 is a flowchart illustrating a fine adjustment method according to some examples of the present disclosure.

FIG. 2 is a flowchart illustrating a fine adjustment method according to some examples of the present disclosure. As shown in FIG. 2, the method includes procedures at blocks 21-23.

At block 21, a surveillance image is pre-divided into N sub-regions with a same size, where N is a positive integer more than 1.

In particular, the value of N may be determined according to actual requirements. In some examples, the value of N may be equal to 9 or 16.

At block 22, when the fine adjustment is performed and it is determined that there is at least one sub-region with abnormal brightness in the N sub-regions, procedures in block 23 are performed.

In this block, a method for determining whether there is the at least one sub-region with the abnormal brightness in the N sub-regions includes: for each sub-region, obtaining a theoretical brightness value and an actual brightness value of the sub-region, calculating an absolute value of a difference between the theoretical brightness value and the actual brightness value, and determining the sub-region is a sub-region with the abnormal brightness if the absolute value is more than a preset threshold.

For each sub-region, a method for obtaining the theoretical brightness value of the sub-region includes: determining an included angle between a central location of the sub-region and an optic axis, determining the theoretical brightness value according to the included angle and a preset light intensity module, wherein the actual brightness value is an average brightness value for pixels in the sub-region.

The included angle between the central location of the sub-region and the optic axis may be represented as $$\gamma = \tan^{-1}\left(\frac{X-x}{x} \times \tan\alpha\right)$$

in radians; wherein X represents a maximum horizontal coordinate value in the surveillance image; x represents a horizontal coordinate value of the central location in the sub-region; α represents a viewing angle (in radians), $$\alpha = \frac{\pi}{180} \times \frac{\theta}{Z},$$

θ represents a maximum horizontal viewing angle of the infrared camera, Z represents a current magnification of the surveillance image.

In a practical application, an upper-left corner of the surveillance image is usually taken as a coordinate origin, thus, a value of X is equal to a length of the surveillance image. It is assumed that a coordinate of a central location of a certain sub-region is (x, y), thus, $$\frac{X-x}{X} = \frac{\tan\gamma}{\tan\alpha}, \text{ i.e., } \gamma = \tan^{-1}\left(\frac{X-x}{x} \times \tan\alpha\right).$$

The light intensity module is usually a light intensity module of an infrared lamp, and may be pre-established. How to determine the theoretical brightness value of the sub-region according to the included angle and the light intensity module may be in accordance with an actual condition, e.g., a calculation equation may be pre-determined according to experiments.

Based on the description above, for each sub-region, if Y is used to represent the theoretical brightness value of the sub-region, and cY is used to represent the actual brightness value of the sub-region, thus, |Y−cY|>ε, wherein ε represents a preset threshold, a detail value of the ε may be determined according to actual requirements. In addition, if Y−cY>ε, the sub-region is in a too-dark state; if Y−cY<−ε, the sub-region is in an overexposed state.

At block 23, according to a preset parameter of a obtained respective sub-region with the abnormal brightness and a preset parameter of the surveillance image, an infrared lamp adjustment mode is determined, and the infrared lamp is adjusted according to the determined infrared lamp adjustment mode until the at least one sub-region with the abnormal brightness returns to normal.

Procedures in this block may be implemented as follows.

A: the preset parameter of the respective sub-region with the abnormal brightness γ is obtained, the preset parameter of the surveillance image Z is obtained, and the viewing angle α is calculated according to Z; wherein γ represents the included angle between the central location of the brightness sub-region and the optic axis, Z is the current magnification of the surveillance image.

B: it is determined whether the at least one sub-region with the abnormal brightness satisfies a condition as follows: the number of the at least one sub-region with the abnormal brightness is equal to 1; or the number of the at least one sub-region with the abnormal brightness is more than 1 and γ of the at least one sub-region with the abnormal brightness are same with each other. If yes, procedures in step C are performed, otherwise, procedures in step D are performed.

C: the unique γ is taken as γ';

α and γ' are respectively compared with β3, β2 and β1, and the infrared lamp adjustment mode is determined according to a comparison result, the brightness of the infrared lamp is adjusted according to the determined infrared lamp adjustment mode until the sub-region corresponding to γ' and with the abnormal brightness returns to normal, and then the procedures finishes;

wherein, β3 represents an illumination angle of a far lamp, β2 represents an illumination angle of a middle lamp, and β1 represents an illumination angle of a near lamp, and the infrared lamp includes the far lamp, the middle lamp and the near lamp.

D: a minimum γ is selected from various γ, and the selected γ is taken as γ', and then procedures in step E are performed.

E: α and γ' are respectively compared with β3, β2 and β1, and the infrared lamp adjustment mode is determined according to a comparison result. The infrared lamp brightness is adjusted according to the determined infrared lamp adjustment mode until the sub-region with the abnormal brightness and corresponding to γ' returns to normal;

It is determined whether there is still at least one sub-region with the abnormal brightness. If no, the procedures finish. If yes, a minimum γ more than γ' is selected from the various γ, the selected γ is taken as γ', and then the procedures in step E is repeatedly performed.

In particular, the process of respectively comparing α, γ' with β3, β2, β1, determining the infrared lamp adjustment mode according to a comparison result, adjusting the infrared lamp brightness according to the determined infrared lamp adjustment mode includes procedures as follows until a sub-region with the abnormal brightness and corresponding to γ' returns to normal.

If $\alpha \leq \beta 3$ and $\gamma' \leq \beta 3$, the brightness of the far lamp is adjusted, and the sub-region with the abnormal brightness and corresponding to $\gamma'$ returns to normal.

If $\alpha \leq \beta 2$ and $\beta 3 < \gamma' \leq \beta 2$, the brightness of the middle light is firstly adjusted, and then the brightness of the far light is adjusted until the sub-region with the abnormal brightness and corresponding to $\gamma'$ returns to normal.

If $\alpha \leq \beta 2$ and $\gamma' \leq \beta 3$, the brightness of the far lamp is adjusted, so that the sub-region with the abnormal brightness and corresponding to $\gamma'$ returns to normal.

If $\alpha \leq \beta 1$ and $\beta 2 \leq \gamma' \leq \beta 1$, the brightness of the near light is firstly adjusted, the brightness of the middle light is secondly adjusted, the brightness of the far light is lastly adjusted, so that the sub-region with the abnormal brightness and corresponding to $\gamma'$ returns to normal.

If $\alpha \leq \beta 1$ and $\beta 3 < \gamma' \leq \beta 2$, the brightness of the middle light is firstly adjusted, and then the brightness of the far light is adjusted, so that the sub-region with the abnormal brightness and corresponding to $\gamma'$ returns to normal.

If $\alpha \leq \beta 1$ and $\gamma' \leq \beta 3$, the brightness of the far light is adjusted, so that the sub-region with the abnormal brightness and corresponding to $\gamma'$ returns to normal.

In some examples, if $\alpha \leq \beta 3$ and $\gamma' \leq \beta 3$, the brightness of the far light is adjusted, so that the sub-region with the abnormal brightness and corresponding to $\gamma'$ returns to normal.

If $\alpha \leq \beta 2$ and $\beta 3 < \gamma' \leq \beta 2$, the brightness of the middle light is adjusted, and the brightness of the far lamp is adjusted if the gain value of the surveillance image is still not adjusted into the reasonable gain interval after the brightness of the middle lamp is adjusted to an extreme value allowed to be adjusted, so that the sub-region with the abnormal brightness and corresponding to $\gamma'$ returns to normal.

If $\alpha \leq \beta 2$ and $\gamma' \leq \beta 3$, the brightness of the far light is adjusted, so that the sub-region with the abnormal brightness and corresponding to $\gamma'$ returns to normal.

If $\alpha \leq \beta 1$ and $\beta 2 < \gamma' \leq \beta 1$, the brightness of the near light is adjusted, the brightness of the middle lamp is adjusted if the gain value of the surveillance image is still not adjusted into the reasonable gain interval after the brightness of the near lamp is adjusted to an extreme value allowed to be adjusted, the brightness of the far lamp is adjusted if the gain value of the surveillance image is still not adjusted into the reasonable gain range after the brightness of the middle lamp is adjusted to an extreme value allowed to be adjusted, so that the sub-region with the abnormal brightness corresponding to $\gamma'$ returns to normal.

If $\alpha \leq \beta 1$ and $\beta 3 < \gamma' \leq \beta 2$, the brightness of the middle light is adjusted, and the brightness of the far lamp is adjusted if the gain value of the surveillance image is still not adjusted into the reasonable gain range after the brightness of the middle lamp is adjusted to an extreme value allowed to be adjusted, so that the sub-region with the abnormal brightness corresponding to $\gamma'$ returns to normal.

If $\alpha \leq \beta 1$ and $\gamma' \leq \beta 3$, the brightness of the far light is adjusted until the sub-region with the abnormal brightness corresponding to $\gamma'$ returns to normal.

Based on the description above, if the number of the at least one sub-region with the abnormal brightness is equal to 1 or if the number of the at least one sub-region with the abnormal brightness is more than 1 and the $\gamma$ of the at least one sub-region with the abnormal brightness is same with each other, the brightness of the infrared lamp is adjusted directly according to $\gamma$ until each sub-region with the abnormal brightness returns to normal.

If there are some sub-regions with the abnormal brightness and $\gamma$ of the sub-regions with the abnormal brightness are different from each other, the minimum $\gamma$ is firstly selected, i.e., a sub-region with the abnormal brightness and closest to the central location of the surveillance image in the sub-regions with the abnormal brightness is firstly adjusted, after the sub-region closest to the central location of the surveillance image returns to normal, since other sub-regions with the abnormal brightness are affected by the adjustment of the sub-region closest to the central location of the surveillance image, all the other sub-regions with the abnormal brightness may return to normal, or a part of the other sub-regions with the abnormal brightness may return to normal, or any of the other sub-regions with the abnormal brightness may not return to normal. For the latter two cases, the process above may be repeatedly processed, i.e., a sub-region closest to the central location of the surveillance image in the remaining sub-regions with the abnormal brightness returns to normal, and so forth.

If the brightness of the far lamp, the middle lamp and the near lamp is adjusted, an adjustment magnitude for each adjustment is determined according to a distance that $|y-cY|$ deviates from $\varepsilon$. In addition, whether the adjustment for increasing the brightness or the adjustment for decreasing the brightness is performed is determined according to regarding whether the sub-region is in the overexposed state or the too dark state.

In addition, take $\alpha \leq \beta 3$ and $\gamma' \leq \beta 3$ as an example. If the brightness of the sub-region with the abnormal brightness and corresponding to $\gamma'$ may still not return to normal after the brightness of the far lamp is adjusted one time, the brightness of the far lamp may be adjusted again, and so forth, until the sub-region with the abnormal brightness and corresponding to $\gamma'$ returns to normal, wherein if $|Y-cY| \leq \varepsilon$, the brightness of the sub-region is normal.

The meaning of being firstly adjusted above refers to the related description in some examples as shown in FIG. 1, which is not repeatedly described herein.

In some examples, the PWM may be used to adjust the far lamp, the middle lamp and the near lamp.

Figure 3:
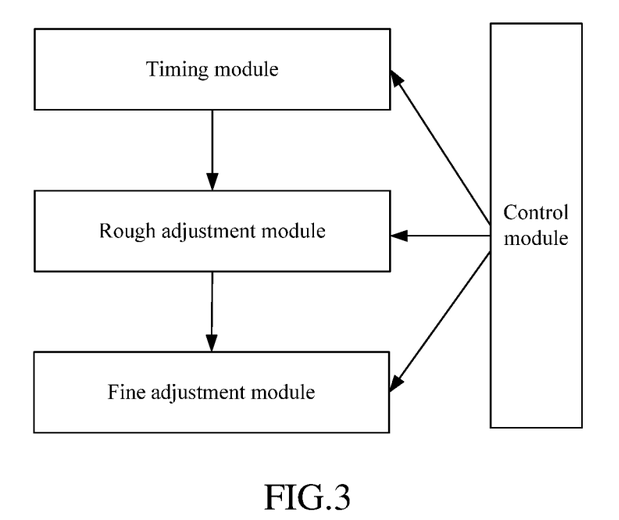
FIG. 3 is a schematic diagram illustrating a structure of an infrared camera according to some examples of the present disclosure.

Based on the description above, FIG. 3 is a schematic diagram illustrating a structure of an infrared camera according to some examples of the present disclosure. As shown in FIG. 3, the infrared camera includes modules as follows.

A timing module is to after an infrared lamp of the infrared camera is opened, notify a fine adjustment module to perform processing in each preset time period.

The fine adjustment module is to determine whether there is at least one sub-region with abnormal brightness in N sub-regions in a surveillance image, the N sub-regions having a same size with each other, N being a positive integer more than 1; if yes, determine an infrared lamp adjustment mode according to a preset parameter of a respective one of the at least one sub-region with the abnormal brightness and a preset parameter of the surveillance image, and adjust a brightness of the infrared lamp according to the determined infrared lamp adjustment mode until the at least one sub-region with the abnormal brightness returns to normal.

In some examples, the infrared camera further includes a rough adjustment module.

The rough adjustment module is to before the fine adjustment module performs the processing, determine whether a gain value of the surveillance image is in a gain interval, if yes, notify the fine adjustment module to perform the processing; if no, determine an infrared lamp adjustment mode according to the preset parameter of the surveillance image, adjust the brightness of the infrared lamp according to the determined infrared lamp adjustment mode until the gain value is adjusted into the gain interval, determine whether there is the at least one sub-region with the abnormal brightness.

In some examples, the rough adjustment module includes a first processing unit and a second processing unit (which are not illustrated in drawings in order to make the drawings brief).

The first processing unit is to determine whether the gain value of the surveillance image is in the reasonable gain interval, if yes, notify the fine adjustment module to perform the processing; if no, notify the second processing unit to perform processing;

The second processing unit is to calculate a viewing angle α according to a magnification of the surveillance image Z, $$\alpha = \frac{\pi}{180} \times \frac{\theta}{Z},$$

wherein θ is a maximum horizontal viewing angle of the infrared camera; respectively compare α with β3, β2 and β1, determine the infrared lamp adjustment mode according to a comparison result, adjusting the brightness of the infrared lamp according to the determined infrared lamp adjustment mode until the gain value of the surveillance image is adjusted into the reasonable gain interval; wherein β3 is an illumination angle of a far lamp, β2 is an illumination angle of a middle lamp, β1 is an illumination angle of a near lamp, and the infrared lamp includes the far lamp, the middle lamp and the near lamp.

In some example, if α≤β3, the second processing unit is to adjust the brightness of the far lamp until the gain value of the surveillance image is adjusted into the reasonable gain interval;

if α≤β2, the second processing unit is to adjust the brightness of the far lamp, if the gain value of the surveillance image is still not adjusted into the gain interval after the brightness of the far lamp is adjusted to an extreme value allowed to be adjusted, adjust the brightness of the middle lamp until the gain value of the surveillance image is adjusted into the reasonable gain interval;

if α≤β1, the second processing unit is to adjust the brightness of the far lamp, if the gain value of the surveillance image is still not adjusted into the gain interval after the brightness of the far lamp is adjusted to an extreme value allowed to be adjusted, adjust the brightness of the middle lamp, if the gain value of the surveillance image is still not adjusted into the gain interval after the brightness of the middle lamp is adjusted to an extreme value allowed to be adjusted, adjust the brightness of the near lamp until the gain value of the surveillance image is adjusted into the reasonable gain interval.

In some examples, the fine adjustment module includes a third processing unit and a fourth processing unit (which are not illustrated in drawings in order to make the drawings brief).

The third processing unit is to for each sub-region, obtain a theoretical brightness value and an actual brightness value of the sub-region, calculate an absolute value of a difference between the theoretical brightness value and the actual brightness value, determine the sub-region is a sub-region with the abnormal brightness if the absolute value is more than a preset threshold, if there is the at least one sub-region with the abnormal brightness, notify the fourth processing unit to perform processing;

the fourth processing unit is to determine the infrared lamp adjustment mode according to the preset parameter of the respective one of the at least one sub-region with the abnormal brightness and the preset parameter of the surveillance image, and adjust the brightness of the infrared lamp according to the determined infrared lamp adjustment mode until the at least one sub-region with the abnormal brightness returns to normal.

In some examples, the third processing unit is to for each sub-region, determine an included angle between a central location of the sub-region and an optic axis, and determine the theoretical brightness value according to the included angle and a preset light intensity module, wherein the actual brightness value is an average brightness value for pixels in the sub-region.

In some examples, the included angle between the central location of the sub-region and the optic axis is $$\gamma = \tan^{-1}\left(\frac{X-x}{x} \times \tan\alpha\right)$$

in radians;

wherein X is a maximum horizontal coordinate value in the surveillance image;

x is a horizontal coordinate value of the central location of the sub-region;

α is the viewing angle, $$\alpha = \frac{\pi}{180} \times \frac{\theta}{Z},$$

θ is a maximum horizontal viewing angle of the infrared camera, Z is the magnification of the surveillance image.

In some examples, the fourth processing unit is to obtain a preset parameter of each sub-region with the abnormal brightness γ and the preset parameter of the surveillance image Z, calculate the viewing angle α according to Z; determine whether the at least one sub-region with the abnormal brightness satisfies a condition as follows: the number of the at least one sub-region with the abnormal brightness is equal to 1; or the number of the at least one sub-region with the abnormal brightness is more than 1 and values of γ of the at least one sub-region with the abnormal brightness are same with each other;

if yes, assign the value of γ to γ', respectively compare α and γ' with β3, β2 and β1, determine the infrared lamp adjustment mode according to a comparison result, adjust the brightness of the infrared lamp according to the determined infrared lamp adjustment mode until a sub-region with the abnormal brightness and corresponding to γ' returns to normal, finish the processing, wherein, β3 is an illumination angle of a far lamp, β2 represents an illumination angle of a middle lamp, and β1 is an illumination angle of a near lamp, and the infrared lamp includes the far lamp, the middle lamp and the near lamp;

if no, select a minimum value of γ from values of γ of the at least one sub-region, assign the selected value of γ to γ', perform preset processing as follows: respectively compare α and γ' with β3, β2 and β1, determine the infrared lamp adjustment mode according to a comparison result, adjust the brightness of the infrared lamp according to the determined infrared lamp adjustment mode until a sub-region with the abnormal brightness and corresponding to γ' returns to normal; determine whether there is at least one sub-region with the abnormal brightness in the adjusted N sub-regions, if no, finish the processing, if yes, select a minimum value of γ more than the value of γ' from values of γ corresponding to the at least one sub-region with the abnormal brightness in the adjusted N sub-regions, assign the value of the selected γ to γ', repeatedly perform the preset processing.

In some examples, if α≤β3 and γ'≤β3, the fourth processing unit is to adjust the brightness of the far light until the sub-region with the abnormal brightness and corresponding to γ' returns to normal;

if α≤β2 and β3<γ'≤β2, the fourth processing unit is to adjust the brightness of the middle light, if the gain value of the surveillance image is still not adjusted into the gain interval after the brightness of the middle lamp is adjusted to an extreme value allowed to be adjusted, adjust the brightness of the far lamp until the sub-region with the abnormal brightness and corresponding to γ' returns to normal;

if α≤β2 and γ'≤β3, the fourth processing unit is to adjust the brightness of the far light until the sub-region with the abnormal brightness and corresponding to γ' returns to normal;

if α≤β1 and β2≤γ'≤β1, the fourth processing unit is to adjust the brightness of the near light, if the gain value of the surveillance image is still not adjusted into the gain interval after the brightness of the near lamp is adjusted to an extreme value allowed to be adjusted, adjust the brightness of the middle lamp, if the gain value of the surveillance image is still not adjusted into the gain range after adjusting the brightness of the middle lamp to an extreme value allowed to be adjusted, adjust the brightness of the far lamp until the sub-region with the abnormal brightness corresponding to γ' returns to normal;

if α≤β1 and β3<γ'≤β2, the fourth processing unit is to adjust the brightness of the middle light, if the gain value of the surveillance image is still not adjusted into the gain range after the brightness of the middle lamp is adjusted to an extreme value allowed to be adjusted, adjust the brightness of the far lamp until the sub-region with the abnormal brightness corresponding to γ' returns to normal;

if α≤β1 and γ'≤β3, the fourth processing unit is to adjust the brightness of the far light until the sub-region with the abnormal brightness corresponding to γ' returns to normal.

In some examples, the infrared camera further includes a control module, to when it is determined that the surveillance image flashes because the brightness is frequently adjusted, lock other modules, unlock the locked modules when a preset unlocking condition is satisfied.

The control module is to unlock the locked modules when it is determined that a preset unlocking time period is reached.

In some examples, the surveillance image may maintain in a steady state or in a slow change state. However, if there are outside interferences from human or specific factors, the brightness may be frequently adjusted. Thus, the surveillance image flashes, and the adjustment process may make the surveillance image worse. According to present disclosure, in this condition, the adjustment function may be locked, and the infrared lamp may maintain a state before the adjustment function is performed according to the present disclosure, accordingly when the surveillance image is in a steady state, the adjustment function may be unlocked.

In a practical application, the infrared camera may further include another component part which is not directly related to the present disclosure, thus, is not described herein.

A detail workflow of the infrared camera in FIG. 3 refers to the description for corresponding method examples, which is not repeatedly described herein.

Figure 4:
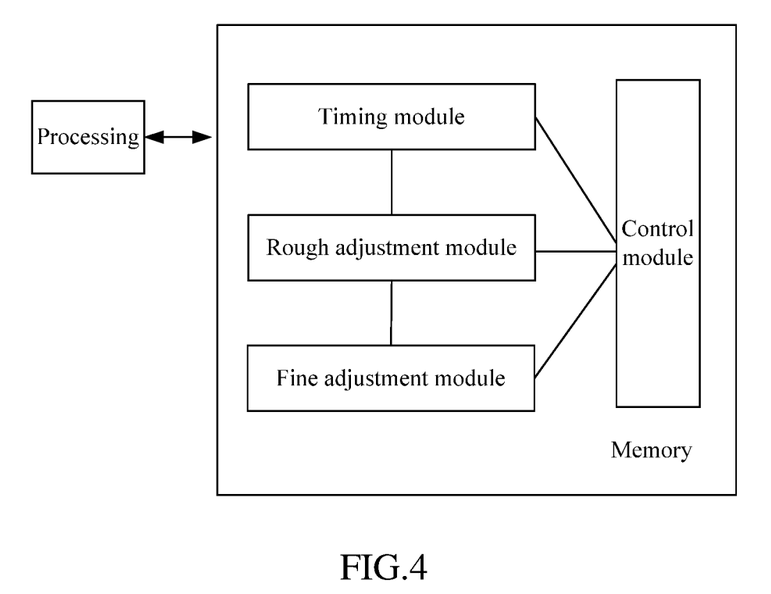
FIG. 4 is a schematic diagram illustrating a structure of an infrared camera according to some examples of the present disclosure.

FIG. 4 is a schematic diagram illustrating a structure of an infrared camera according to some examples of the present disclosure. As shown in FIG. 4, the infrared camera at least includes a memory and a processor communicating with the memory. The memory includes a timing instruction and a fine adjustment instruction, which are executed by the processor.

The timing instruction is to after an infrared lamp of the infrared camera is opened, notify a fine adjustment instruction to perform processing in each preset time period.

The fine adjustment instruction is to determine whether there is at least one sub-region with abnormal brightness in N sub-regions in a surveillance image, the N sub-regions having a same size with each other, N being a positive integer more than 1; if yes, determine an infrared lamp adjustment mode according to a preset parameter of a respective one of the at least one sub-region with the abnormal brightness and a preset parameter of the surveillance image, and adjust a brightness of the infrared lamp according to the determined infrared lamp adjustment mode until the at least one sub-region with the abnormal brightness returns to normal.

In some example, the infrared camera further includes a rough adjustment instruction.

The rough adjustment instruction is to before the fine adjustment instruction performs the processing, determine whether a gain value of the surveillance image is in a gain interval, if yes, notify the fine adjustment instruction to perform the processing; if no, determine an infrared lamp adjustment mode according to the preset parameter of the surveillance image, adjust the brightness of the infrared lamp according to the determined infrared lamp adjustment mode until the gain value is adjusted into the gain interval, notify the fine adjustment instruction to perform the processing.

A detail workflow of the infrared camera in FIG. 4 refers to the description for corresponding method examples, which is not repeatedly described herein.

According to the present disclosure, a brightness adjustment is performed for each sub-region, so as to avoid that a certain sub-region is too dark or overexposed and to improve image quality of the surveillance image. Further, a rough adjustment is combined with a fine adjustment, thus, the whole surveillance image is clear, and image details are also reserved, i.e., the clarity of the details of the surveillance image is ensured. In addition, the brightness of the infrared lamp is adjusted multiple times, so as to improve implementation flexibility and applicability.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. An infrared lamp brightness adjusting method for an infrared camera, comprising:
   after an infrared lamp of the infrared camera is opened, performing processing as follows in each preset time period:
   determining whether there is at least one sub-region with abnormal brightness in N sub-regions in a surveillance image, the N sub-regions having a same size with each other, N being a positive integer more than 1;

wherein the infrared lamp of the infrared camera includes a near lamp, a middle lamp, and a far lamp; the far lamp, the middle lamp and the near lamp have different illumination angles;

if yes, obtaining a preset parameter of the surveillance image, calculating a viewing angle α of the surveillance image according to the preset parameter, determining an infrared lamp adjustment mode through comparing a preset parameter of a respective one of the at least one sub-region with the abnormal brightness and the viewing angle of the surveillance image, and adjusting a brightness of the far lamp, the middle lamp and the near lamp according to the determined infrared lamp adjustment mode until the at least one sub-region with the abnormal brightness returns to normal.

2. The method of claim 1, further comprising: before determining whether there is the at least one sub-region with the abnormal brightness, determining whether a gain value of the surveillance image is in a gain interval, if yes, determining whether there is the at least one sub-region with the abnormal brightness;

if no, determining a second infrared lamp adjustment mode according to the preset parameter of the surveillance image, adjusting the brightness of the infrared lamp according to the determined second infrared lamp adjustment mode until the gain value is adjusted into the gain interval, determining whether there is the at least one sub-region with the abnormal brightness.

3. The method of claim 2, wherein determining the second infrared lamp adjustment mode according to the preset parameter of the surveillance image, adjusting the infrared lamp brightness according to the determined second infrared lamp adjustment mode until the gain value of the surveillance image is adjusted into the gain interval comprises:

calculating the viewing angle α according to a magnification Z of the surveillance image, $$\alpha = \frac{\pi}{180} \times \frac{\theta}{Z},$$

wherein θ is a maximum horizontal viewing angle of the infrared camera;

respectively comparing α with β3, β2 and β1, determining the second infrared lamp adjustment mode according to a comparison result, adjusting the brightness of the infrared lamp according to the determined second infrared lamp adjustment mode until the gain value of the surveillance image is adjusted into the gain interval;

wherein β3 is an illumination angle of the far lamp, β2 is an illumination angle of the middle lamp, β1 is an illumination angle of the near lamp.

4. The method of claim 3, wherein adjusting the brightness of the infrared lamp according to the determined second infrared lamp adjustment mode until the gain value of the surveillance image is adjusted into the gain interval comprises:

if α≤β3, adjusting the brightness of the far lamp until the gain value of the surveillance image is adjusted into the gain interval;

if α≤β2, adjusting the brightness of the far lamp, if the gain value of the surveillance image is still not adjusted into the gain interval after the brightness of the far lamp is adjusted to an extreme value allowed to be adjusted, adjusting the brightness of the middle lamp until the gain value of the surveillance image is adjusted into the gain interval;

if α≤β1, adjusting the brightness of the far lamp, if the gain value of the surveillance image is still not adjusted into the gain interval after the brightness of the far lamp is adjusted to an extreme value allowed to be adjusted, adjusting the brightness of the middle lamp, if the gain value of the surveillance image is still not adjusted into the gain interval after the brightness of the middle lamp is adjusted to an extreme value allowed to be adjusted, adjusting the brightness of the near lamp until the gain value of the surveillance image is adjusted into the gain interval.

5. The method of claim 1, wherein determining whether there is the at least one sub-region with the abnormal brightness comprises:

for each sub-region, obtaining a theoretical brightness value and an actual brightness value of the sub-region, calculating an absolute value of a difference between the theoretical brightness value and the actual brightness value, determining the sub-region is a sub-region with the abnormal brightness if the absolute value is more than a preset threshold.

6. The method of claim 5, wherein obtaining the theoretical brightness value of the sub-region comprises:

determining an included angle between a central location of the sub-region and an optic axis, determining the theoretical brightness value according to the included angle and a preset light intensity module, wherein the actual brightness value is an average brightness value for pixels in the sub-region.

7. The method of claim 6, wherein the included angle between the central location of the sub-region and the optic axis is $$\gamma = \tan^{-1}\left(\frac{X-x}{x} \times \tan\alpha\right)$$

in radians;

wherein X is a maximum horizontal coordinate value in the surveillance image;

x is a horizontal coordinate value of the central location of the sub-region;

α is the viewing angle, $$\alpha = \frac{\pi}{180} \times \frac{\theta}{Z},$$

θ is a maximum horizontal viewing angle of the infrared camera, Z is a magnification of the surveillance image.

8. The method of claim 7, wherein determining the infrared lamp adjustment mode according to the preset parameter of the respective one of the at least one sub-region with the abnormal brightness and a preset parameter of the surveillance image, and adjusting the brightness of the infrared lamp according to the determined infrared lamp adjustment mode until the at least one sub-region with the abnormal brightness returns to normal comprises:

A: obtaining a preset parameter of each sub-region with the abnormal brightness γ and the preset parameter Z of the surveillance image, calculating the viewing angle α according to Z;

B: determining whether the at least one sub-region with the abnormal brightness satisfies a condition as follows: number of the at least one sub-region with the abnormal brightness is equal to 1; or the number of the at least one sub-region with the abnormal brightness is more than 1 and values of γ of the at least one sub-region with the abnormal brightness are same with each other, if yes, performing procedures in step C, otherwise, performing procedures in step D;

C: assigning the value of γ to γ';

respectively comparing α and γ' with β3, β2 and β1, determining the infrared lamp adjustment mode according to a comparison result, adjusting the brightness of the infrared lamp according to the determined infrared lamp adjustment mode until a sub-region with the abnormal brightness and corresponding to γ' returns to normal, finishing the processing;

wherein, β3 is an illumination angle of the far lamp, β2 represents an illumination angle of the middle lamp, and β1 is an illumination angle of the near lamp;

D: selecting a minimum value of γ from values of γ of the at least one sub-region, assigning the selected value of γ to γ', performing procedures in step E;

E: respectively comparing α and γ' with β3, β2 and β1, determining the infrared lamp adjustment mode according to a comparison result, adjusting the brightness of the infrared lamp according to the determined infrared lamp adjustment mode until a sub-region with the abnormal brightness and corresponding to γ' returns to normal;

determining whether there is at least one sub-region with the abnormal brightness in the adjusted N sub-regions, if no, finishing the processing, if yes, selecting a minimum value of γ more than the value of γ' from values of γ corresponding to the at least one sub-region with the abnormal brightness in the adjusted N sub-regions, re-assigning the value of the selected γ to γ', repeatedly performing the procedures in step E.

9. The method of claim 8, wherein respectively comparing α and γ' with β3, β2 and β1, determining the infrared lamp adjustment mode according to the comparison result, adjusting the brightness of the infrared lamp according to the determined infrared lamp adjustment mode until the sub-region with the abnormal brightness and corresponding to γ' returns to normal comprises:

if α≤β3 and γ'≤β3, adjusting the brightness of a far light until the sub-region with the abnormal brightness and corresponding to γ' returns to normal;

if α≤β2 and β3<γ'≤β2, adjusting the brightness of a middle light, if the gain value of the surveillance image is still not adjusted into the gain interval after the brightness of the middle lamp is adjusted to an extreme value allowed to be adjusted, adjusting the brightness of the far lamp until the sub-region with the abnormal brightness and corresponding to γ' returns to normal;

if α≤β2 and γ'≤β3, adjusting the brightness of the far light until the sub-region with the abnormal brightness and corresponding to γ' returns to normal;

if α≤β1 and β2<γ'≤β1, adjusting the brightness of a near light, if the gain value of the surveillance image is still not adjusted into the gain interval after the brightness of the near lamp is adjusted to an extreme value allowed to be adjusted, adjusting the brightness of the middle lamp, if the gain value of the surveillance image is still not adjusted into the gain range after adjusting the brightness of the middle lamp to an extreme value allowed to be adjusted, adjusting the brightness of the far lamp until the sub-region with the abnormal brightness corresponding to γ' returns to normal;

if α≤β1 and in β3<γ'≤β2, adjusting the brightness of the middle light, if the gain value of the surveillance image is still not adjusted into the gain range after the brightness of the middle lamp is adjusted to an extreme value allowed to be adjusted, adjusting the brightness of the far lamp until the sub-region with the abnormal brightness corresponding to γ' returns to normal;

if α≤β1 and γ'≤β3, adjusting the brightness of the far light until the sub-region with the abnormal brightness corresponding to γ' returns to normal.

10. An infrared camera, comprising: a processor and memory storing instructions that, when executed by the processor, cause the processor to:

after an infrared lamp of the infrared camera is opened, perform processing as follows in each preset time period;

determine whether there is at least one sub-region with abnormal brightness in N sub-regions in a surveillance image, the N sub-regions having a same size with each other, N being a positive integer more than 1;

wherein the infrared lamp of the infrared camera includes a near lamp, a middle lamp, and a far lamp; the far lamp, the middle lamp and the near lamp have different illumination angles;

if yes, obtain a preset parameter of the surveillance image, calculate a viewing angle α of the surveillance image according to the preset parameter, determine an infrared lamp adjustment mode through comparing a preset parameter of a respective one of the at least one sub-region with the abnormal brightness and the viewing angle of the surveillance image, and adjust a brightness of the far lamp, the middle lamp and the near lamp according to the determined infrared lamp adjustment mode until the at least one sub-region with the abnormal brightness returns to normal.

11. The infrared camera of claim 10, wherein the instructions further cause the processor to:

before determining whether there is the at least one sub-region with the abnormal brightness, determine whether a gain value of the surveillance image is in a gain interval, if yes, determine whether there is the at least one sub-region with the abnormal brightness; if no, determine a second infrared lamp adjustment mode according to the preset parameter of the surveillance image, adjust the brightness of the infrared lamp according to the determined second infrared lamp adjustment mode until the gain value is adjusted into the gain interval, determine whether there is the at least one sub-region with the abnormal brightness.

12. The infrared camera of claim 11, wherein the instructions further cause the processor to:

determine whether the gain value of the surveillance image is in the gain interval, if no, calculate the viewing angle α according to a magnification of the surveillance image Z, $$\alpha = \frac{\pi}{180} \times \frac{\theta}{Z},$$

wherein θ is a maximum horizontal viewing angle of the infrared camera; respectively compare α with β3, β2 and β1, determine the second infrared lamp adjustment mode according to a comparison result, adjusting the brightness of the infrared lamp according to the determined second infrared lamp adjustment mode until the gain value of the surveillance image is adjusted into the gain interval; wherein β3 is an illumination angle of the far lamp, β2 is an illumination angle of the middle lamp, β1 is an illumination angle of the near lamp.

13. The infrared camera of claim 12, wherein
if α≤β3, adjust the brightness of the far lamp until the gain value of the surveillance image is adjusted into the gain interval;
if α≤β2, adjust the brightness of the far lamp, if the gain value of the surveillance image is still not adjusted into the gain interval after the brightness of the far lamp is adjusted to an extreme value allowed to be adjusted, adjust the brightness of the middle lamp until the gain value of the surveillance image is adjusted into the gain interval;
if α≤β1, adjust the brightness of the far lamp, if the gain value of the surveillance image is still not adjusted into the gain interval after the brightness of the far lamp is adjusted to an extreme value allowed to be adjusted, adjust the brightness of the middle lamp, if the gain value of the surveillance image is still not adjusted into the gain interval after the brightness of the middle lamp is adjusted to an extreme value allowed to be adjusted, adjust the brightness of the near lamp until the gain value of the surveillance image is adjusted into the gain interval.

14. The infrared camera of claim 10, wherein the instructions further cause the processor to:
for each sub-region, obtain a theoretical brightness value and an actual brightness value of the sub-region, calculate an absolute value of a difference between the theoretical brightness value and the actual brightness value, determine the sub-region is a sub-region with the abnormal brightness if the absolute value is more than a preset threshold, if there is the at least one sub-region with the abnormal brightness,
determine the infrared lamp adjustment mode according to the preset parameter of the respective one of the at least one sub-region with the abnormal brightness and the preset parameter of the surveillance image, and adjust the brightness of the infrared lamp according to the determined infrared lamp adjustment mode until the at least one sub-region with the abnormal brightness returns to normal.

15. The infrared camera of claim 14, wherein the instructions further cause the processor to:
for each sub-region, determine an included angle between a central location of the sub-region and an optic axis, determine the theoretical brightness value according to the included angle and a preset light intensity module, wherein the actual brightness value is an average brightness value for pixels in the sub-region.

16. The infrared camera of claim 15, wherein
the included angle between the central location of the sub-region and the optic axis is $$\gamma = \tan^{-1}\left(\frac{X-x}{x} \times \tan\alpha\right)$$

in radians;
wherein X is a maximum horizontal coordinate value in the surveillance image;
x is a horizontal coordinate value of the central location of the sub-region;
α is the viewing angle, $$\alpha = \frac{\pi}{180} \times \frac{\theta}{Z},$$

θ is a maximum horizontal viewing angle of the infrared camera, Z is a magnification of the surveillance image.

17. The infrared camera of claim 16, wherein the instructions further cause the processor to:
obtain a preset parameter of each sub-region with the abnormal brightness γ and the preset parameter Z of the surveillance image, calculate the viewing angle α according to Z; determine whether the at least one sub-region with the abnormal brightness satisfies a condition as follows: number of the at least one sub-region with the abnormal brightness is equal to 1; or the number of the at least one sub-region with the abnormal brightness is more than 1 and values of γ of the at least one sub-region with the abnormal brightness are same with each other;
if yes, assign the value of γ to γ', respectively compare α and γ' with β3, β2 and β1, determine the infrared lamp adjustment mode according to a comparison result, adjust the brightness of the infrared lamp according to the determined infrared lamp adjustment mode until a sub-region with the abnormal brightness and corresponding to γ' returns to normal, finish the processing, wherein, β3 is an illumination angle of the far lamp, β2 represents an illumination angle of the middle lamp, and β1 is an illumination angle of the near lamp;
if no, select a minimum value of γ from values of γ of the at least one sub-region, assign the selected value of γ to γ', perform preset processing as follows: respectively compare α and γ' with β3, β2 and β1, determine the infrared lamp adjustment mode according to a comparison result, adjust the brightness of the infrared lamp according to the determined infrared lamp adjustment mode until a sub-region with the abnormal brightness and corresponding to γ' returns to normal; determine whether there is at least one sub-region with the abnormal brightness in the adjusted N sub-regions, if no, finish the processing, if yes, select a minimum value of γ more than the value of γ' from values of γ corresponding to the at least one sub-region with the abnormal brightness in the adjusted N sub-regions, re-assign the value of the selected γ to γ', repeatedly perform the preset processing.

18. The infrared camera of claim 17, wherein the instructions further cause the processor to:
if α≤β3 and γ'≤β3, adjust the brightness of a far light until the sub-region with the abnormal brightness and corresponding to γ' returns to normal;
if α≤β2 and β3<γ'≤β2, adjust the brightness of a middle light, if the gain value of the surveillance image is still not adjusted into the gain interval after the brightness of the middle lamp is adjusted to an extreme value allowed to be adjusted, adjust the brightness of the far lamp until the sub-region with the abnormal brightness and corresponding to γ' returns to normal;

if $\alpha \leq \beta 2$ and $\gamma' \leq \beta 3$, adjust the brightness of the far light until the sub-region with the abnormal brightness and corresponding to $\gamma'$ returns to normal;

if $\alpha \leq \beta 1$ and $\beta 2 < \gamma' \leq \beta 1$, adjust the brightness of a near light, if the gain value of the surveillance image is still not adjusted into the gain interval after the brightness of the near lamp is adjusted to an extreme value allowed to be adjusted, adjust the brightness of the middle lamp, if the gain value of the surveillance image is still not adjusted into the gain range after adjusting the brightness of the middle lamp to an extreme value allowed to be adjusted, adjust the brightness of the far lamp until the sub-region with the abnormal brightness corresponding to $\gamma'$ returns to normal;

if $\alpha \leq \beta 1$ and $\beta 3 < \gamma' \leq \beta 2$, adjust the brightness of the middle light, if the gain value of the surveillance image is still not adjusted into the gain range after the brightness of the middle lamp is adjusted to an extreme value allowed to be adjusted, adjust the brightness of the far lamp until the sub-region with the abnormal brightness corresponding to $\gamma'$ returns to normal;

if $\alpha \leq \beta 1$ and $\gamma' \leq \beta 3$, adjust the brightness of the far light until the sub-region with the abnormal brightness corresponding to $\gamma'$ returns to normal.

19. The infrared camera of claim 10, wherein the instructions further cause the processor to:

when it is determined that the surveillance image flashes, lock the infrared camera, unlock the infrared camera when a preset unlocking time period is reached.

* * * * *